(No Model.)
J. T. BENNETT.
APPARATUS FOR REMOVING SACCHARIN OR OTHER IMPURITIES FROM WINE.
No. 604,927. Patented May 31, 1898.
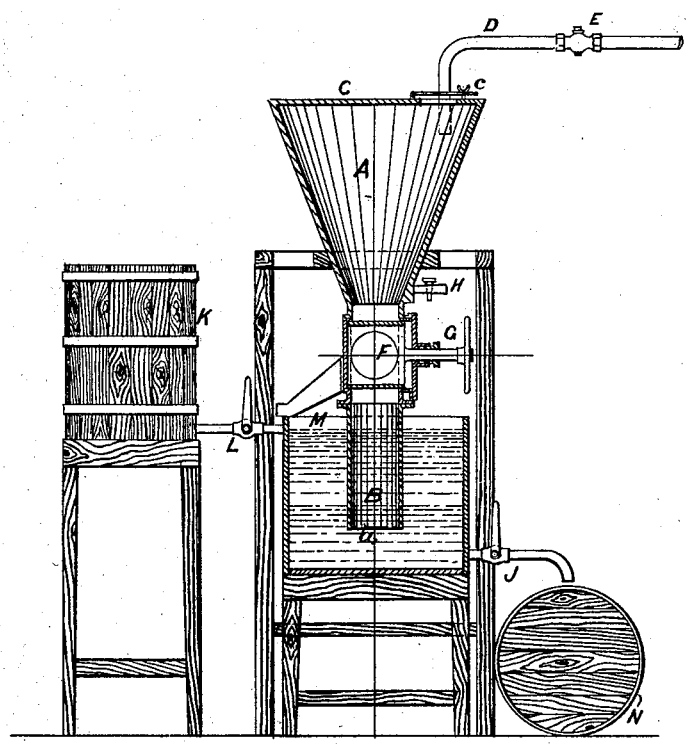

UNITED STATES PATENT OFFICE.

JOHN THOMAS BENNETT, OF CAPE TOWN, CAPE COLONY.

APPARATUS FOR REMOVING SACCHARIN OR OTHER IMPURITIES FROM WINE.

SPECIFICATION forming part of Letters Patent No. 604,927, dated May 31, 1898.

Application filed February 15, 1897. Serial No. 623,471. (No model.) Patented in Cape Colony May 7, 1896, No. 1,163, and in England October 19, 1896, No. 22,403.

*To all whom it may concern:*

Be it known that I, JOHN THOMAS BENNETT, hotel-proprietor, a subject of the Queen of England, residing at Wynberg, Cape Town, Cape Colony, have invented certain Improvements in Apparatus for Removing Saccharin or other Impurities from Wines and Spirits, (for which I have obtained patents in Cape Colony, No. 1,163, dated May 7, 1896, and in England, No. 22,403, dated October 19, 1896,) of which the following is a specification, reference being had therein to the accompanying drawing.

This invention relates to an apparatus for effecting the removal in a simple and inexpensive manner of saccharin, vegetable, and other foreign matters from wines or spirits in which they may exist.

I have found by experiments that by inserting a vessel filled with wine or spirituous liquor in an inverted position within another vessel containing water, provided the aperture of the vessel containing wine is considerably smaller than that of the vessel containing the water, owing to the weight of the atmosphere, no appreciable commingling of the two liquids will take place, but that heavy matter, such as saccharin or vegetable substances, in the wine or spirit will pass into the water, leaving the wine comparatively free from such substances.

In carrying out my invention I employ an apparatus constructed as hereinafter described and as shown on the accompanying drawing, upon which the figure is a side elevation of my improved apparatus, shown partly in section.

As will be seen on the drawing, I arrange a chute or funnel-shaped vessel A for the reception of the wine or spirit to be treated over a vat B containing water, so that the lower and narrow end of the chute extends a sufficient distance below the water-level, and has an aperture at its lower extremity $a$ of considerably smaller area than the surface of the water exposed to atmospheric pressure in the vat. The chute A is furnished with a cover C, hermetically closing the top, and through this cover C a suitable supply-pipe D, connected therewith by an air-tight joint $c$, delivers the wine into the chute A. A valve or cock E near the delivery end of the pipe D is arranged to form an air-tight closure between the chute A and the supply-pipe D when desired. Near the bottom of the chute A a circular door or valve F is provided, having a handle G for the purpose of operating it from the outside. By closing this door or valve the action of the apparatus may be suspended, and the wine in the chute which has been purified can then be withdrawn through a tap H immediately above the circular door or valve F, this tap H serving also as a test-tap to ascertain when the wine is sufficiently clear, or the water in the vat B may be run off through a draw-off J provided at the lower part of the vessel.

The vat B is supplied with water either from a tank K or direct from a service-pipe through a tap L in the side connected at any desired height above the normal water-level M. A barrel or other receptacle N may be provided below the draw-off J to receive the waste liquid, or the waste may be allowed to run off into a drain without first passing into a receptacle.

In operation the vat B is first filled with water through the supply-tap L up to approximately the level M above the lower aperture of the chute, the supply and draw-off taps L and J being then closed. The wine or spirit to be purified is then introduced through the valve E in the pipe D until the chute A is full, when the valve E is closed. By reason of the atmospheric pressure on the exposed surface of the water in the vat B and of the absence of air-pressure above the wine in the chute A the wine and water, though in contact, will not appreciably commingle, but the heavy substances—saccharin or vegetable impurities—in the wine will descend into the water.

By testing the wine or spirit at the test-cock H it can be ascertained when the liquor has been sufficiently treated, and it can then be drawn off into bottles or casks, as may be required, the circular door or valve F being first closed and the test-tap H used as a draw-off, or a separate tap may be provided for this purpose at the same level as the test-tap.

The valve or cock E, controlling the inlet into the funnel-shaped vessel A, should be provided also with an air-inlet for the purpose of admitting air when the contents of the vessel A are being withdrawn through the cock H.

Should it be found necessary to introduce fresh water into the vat during the treatment of the wine, owing to the water becoming too fully impregnated with saccharin or other foreign substances, such fresh water may be admitted through the tap L, an equivalent outflow being allowed through the tap J. A certain amount of wine between the level of the water and the test-cock H will be lost each time the liquor is drawn off; but this quantity will be comparatively small and its quality inferior, owing to the narrow section of the lower part of the chute A and the gravitation of the impurities into this lower part.

What I claim as my invention, and desire to secure by Letters Patent, is—

1. An apparatus for separating heavy impurities from wines and spirits, by gravity, comprising the combination of an open vat containing water, a vessel suspended above said vat and provided with an air-tight cover and a valved supply-pipe, an extension from the lower part of the funnel-shaped vessel of reduced diameter and extending into the water in the vat, a cut-off valve between the funnel-shaped vessel and the extension, and a draw-off cock above the cut-off valve, substantially as described.

2. In an apparatus for separating saccharin and other heavy impurities from wines and spirits by gravity, the combination with the vat B open at the top and supplied with water, of the funnel-shaped vessel A having an air-tight cover and provided with a valved inlet-pipe E, an extension from the lower end of the vessel A immersed in the water in the vat, a cut-off valve between the vessel A and the extension, a draw-off cock above the cut-off valve, a water-inlet connection for the vat and an outlet connection therefrom, substantially as described.

In witness whereof I have hereunto set my hand in the presence of two witnesses.

JOHN THOMAS BENNETT.

Witnesses:
ALBERT GLIDDON,
D. A. ARDERNE.